United States Patent [19]

Sanchas

[11] Patent Number: 4,828,281
[45] Date of Patent: May 9, 1989

[54] CONVERTIBLE CAR SEAT STROLLER

[76] Inventor: David K. Sanchas, 300 New Meadow Rd., Barrington, R.I. 02806

[21] Appl. No.: 93,761

[22] Filed: Sep. 8, 1987

[51] Int. Cl.⁴ ............................................. B62B 7/12
[52] U.S. Cl. .................................... 280/30; 280/648; 280/649; 280/47.371; 297/250; 297/DIG. 4
[58] Field of Search .................. 280/30, 37, 643, 648, 280/649, 47.41, 47.4, 47.37 R; 297/130, 250, 254, DIG. 4

[56] References Cited

U.S. PATENT DOCUMENTS

| | | | |
|---|---|---|---|
| 2,089,090 | 8/1937 | Giacomo et al. | 297/254 |
| 2,509,103 | 5/1950 | Lewis et al. | 297/130 |
| 2,564,266 | 8/1951 | Linton | 280/37 |
| 2,778,653 | 1/1957 | Denby et al. | 280/37 |
| 4,345,791 | 8/1982 | Bryans | 297/250 |
| 4,537,414 | 8/1985 | Nusbaum | 280/47.37 R |
| 4,632,409 | 12/1986 | Hou | 280/30 |
| 4,678,196 | 7/1987 | Van Steenburg | 280/47.41 |

FOREIGN PATENT DOCUMENTS

| | | | |
|---|---|---|---|
| 640844 | 7/1928 | France | 280/649 |
| 1512370 | 6/1978 | United Kingdom | 297/250 |

Primary Examiner—David M. Mitchell
Attorney, Agent, or Firm—Leon Gilden

[57] ABSTRACT

A child's safety car seat is set forth selectively convertible into a stroller. In a first configuration, the child safety car seat is formed of two units wherein the first is nestable within the second to enable convenient positioning on a typical automotive car seat. By disengaging the first portion from the second, a rearwardly positioned handle is pivoted substantialy 180 degrees into an upright lock position simultaneously extending plural pairs of rollers positioned to extending linkage to enable the apparatus to perform the function of a child's stroller.

7 Claims, 6 Drawing Sheets

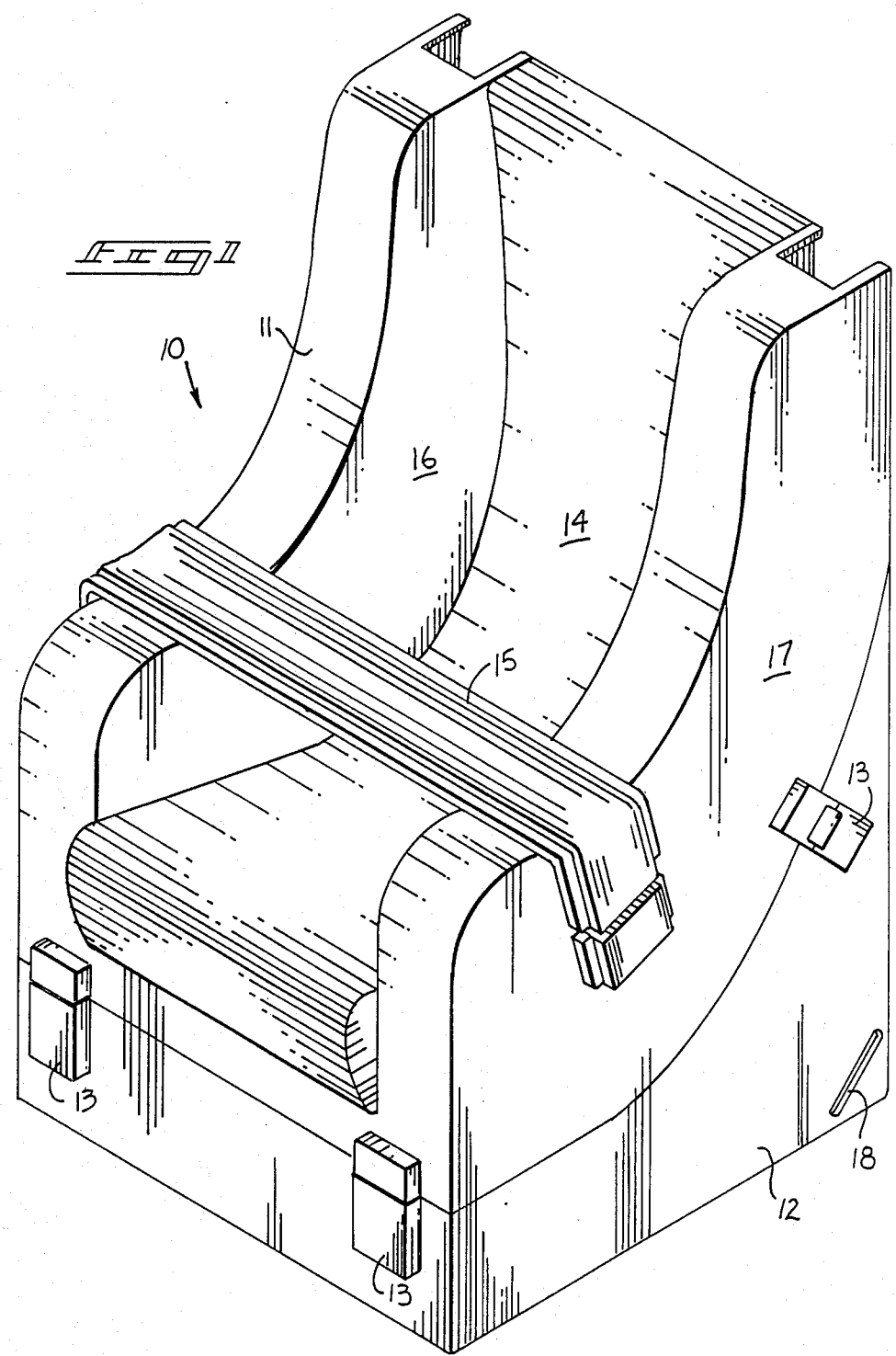

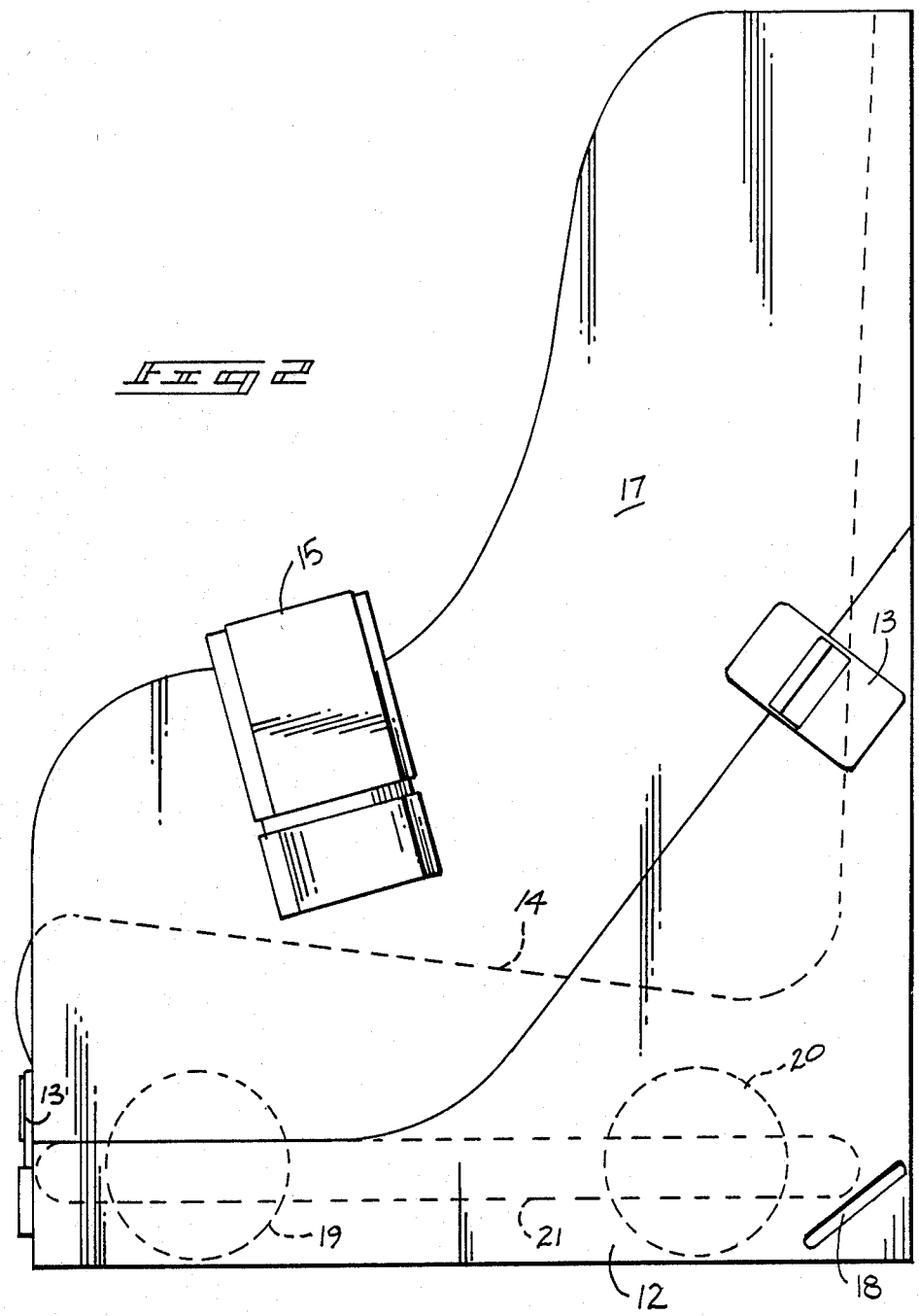

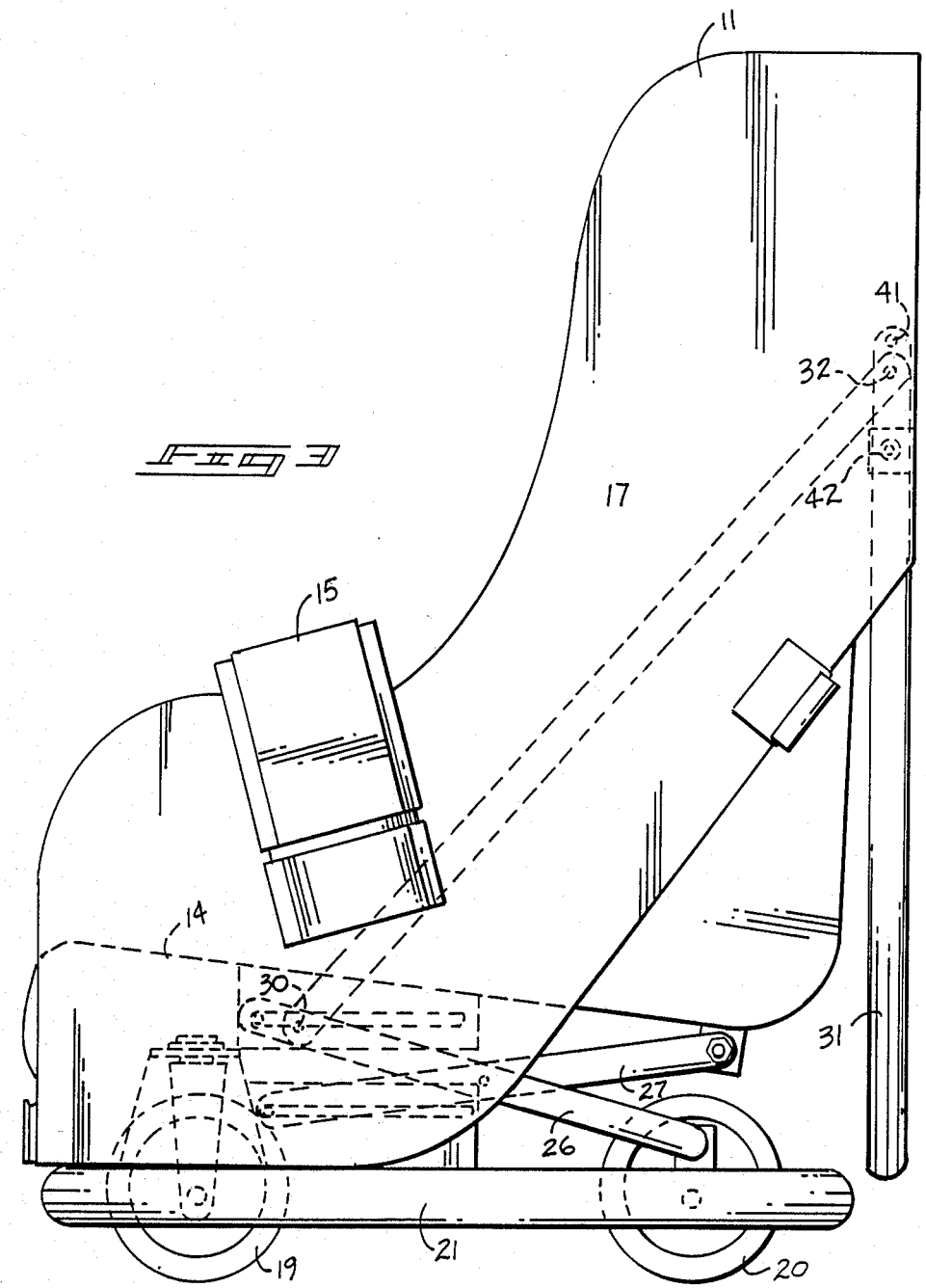

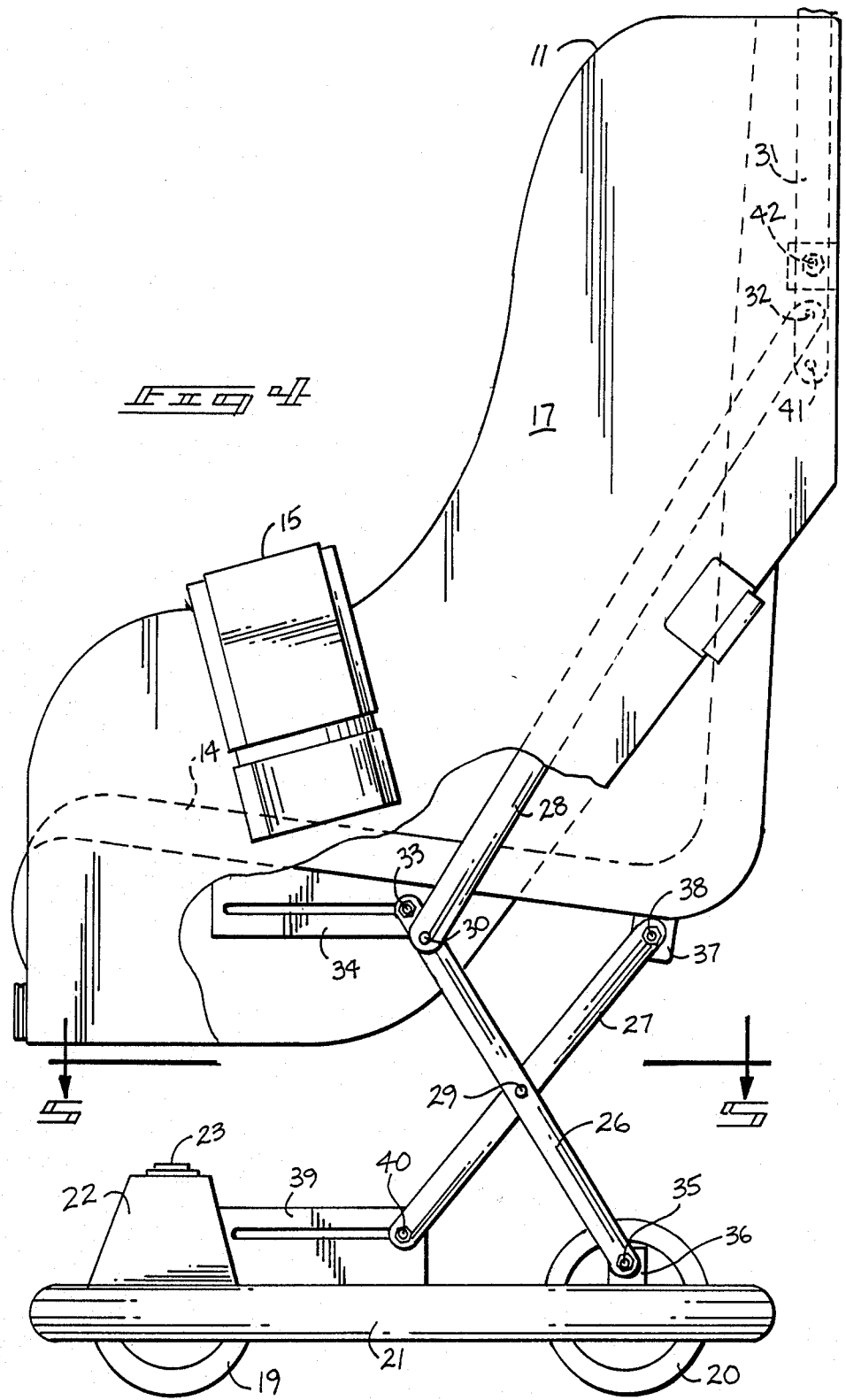

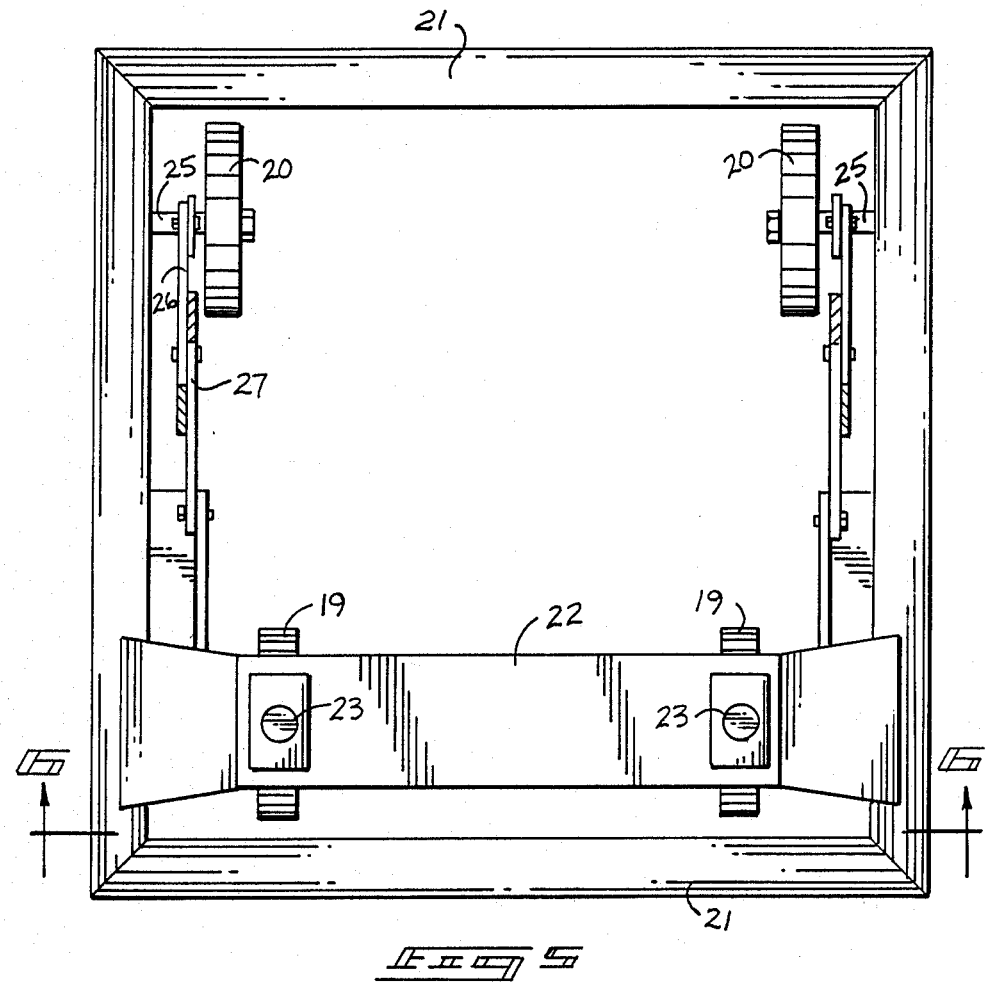

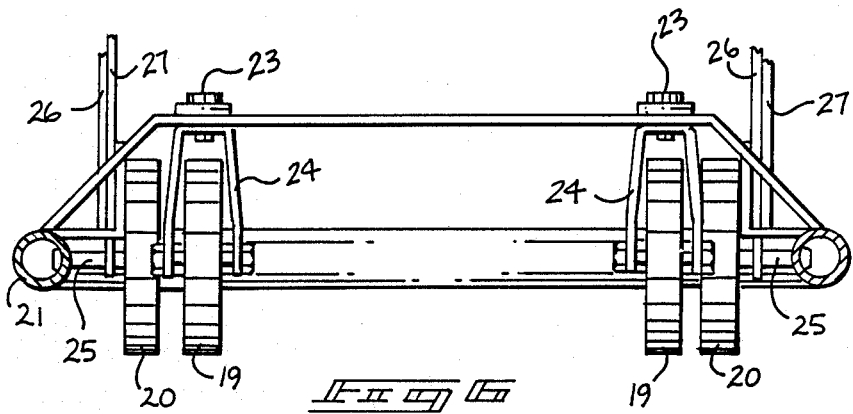

CONVERTIBLE CAR SEAT STROLLER

BACKGROND OF THE INVENTION

1. Field of the Invention

The present invention relates to children's furniture and more particularly pertains to a new and improved convertible car seat stroller arrangement which in a first orientation may be folded into a compact size and secured to an automotive car seat and when extended into a second position may be utilized as a stroller for a child.

2. Description of the Prior Art

The use of children's securement devices is well known in the art. As may be appreciated, these devices usually require substantial amount of space and as such is desirable to create convertible units wherever possible. Typically during transport of small children, accessory furniture must conventionally be transported therealong to provide the various functions necessary in the transport of children. Typically a child's car safety seat is secured to an automotive seat to enable safe securement of a child thereto whereas additionally in the event of a younger child or infant, a stroller apparatus must also be transported creating in many instances inconvenient and burdensome transport problems to users. In this connection, there have been several attempts to develop convertible child securement apparatus which may be easily and efficiently utilized when necessary. For example, U.S. Pat. No. 4,065,175 to Perego sets forth a convertible high chair that may be reoriented for transport and storage. Conceptually, the idea of Perego is similar but in a wholly different environment with attendant function and use. For example, the seat portion of the high chair may be unfastened to provide a free standing chair and as noted, may be rearticulated for transport and storage. While being a functional solution for the storage during periods of user inactivity, the patent is not particularly adapted for usefulness in an automotive environment nor of any use as a stroller.

U.S. Pat. No. 2,720,911 to Lantz sets forth a convertible baby stroller and car seat combination. In Lantz the wheels are interfolded to be secured under the main framework of the seat and the various back and foot portions may be refolded, as desired, for use. The Lantz patent in general is a rather complex and bulky coordination of elements with limited relationship to the instant invention other than through the basic concept thereof.

U.S. Pat. No. 2,697,477 to Welsh illustrates a child's seat that may be adapted for automotive use in combination with a baby swing. The Welsh patent does not provide the convertibility nor the dual usefulness of an apparatus that may be adapted from one function to another employing all of the integral elements in a single unit or requires associated members to effect conversion from one function to another. The relative bulkiness of the Welsh device and the attendant structure required for conversion limits the adaptability of the device for multiple use, as is required in contemporary activities involved in the transport of small children.

U.S. Pat. No. 4,540,216 to Hassel sets forth the use of a convertible child's seat which when in an interfolded state collapses within the interior of an existing automotive seat and when extended provides features of a child's safety seat. Clearly, the Hassel patent does not enable the multiple use outside of the automotive enviroment as does the instant invention and accordingly afford limited versatility as does the instant invention.

U.S. Pat. No. 1,965,048 to Morris sets forth a particular seating arrangement for children associated with automobiles and enables a child's seat to be manipulated in a variety of manners in association with an existing automotive seat or in a new combination therewith enabling comfort of a child secured thereto. The Morris patent, as the Hassel patent, does not enable versatility for conversion of one function to another involving the use of children's furniture or equipment.

French Pat. No. 953,381 to Leroy illustrates a convertible child's stroller to high chair arrangement involving a complex matrix of interrelating linkages to perform this function. While of interest in a convertible child seat enabling multiple functions, the bulkiness and awkwardness of the device as well as its non-operability to automotive environments limits its relevance to the instant invention.

Italian Pat. No. 434,688 sets forth a convertible child's high chair which transforms into a stroller arrangement by the mere pivoting of the child's seating arrangement relative to the framework it is secured to. While an interesting concept, it also lacks applicability to an automotive environment and particularly to a convertible equipment enabling a child's car seat to convert into a stroller removed from the automotive environment.

As such, it may be appreciated that there is a continuing need for a new and improved convertible car seat stroller arrangement which addresses both the problems of storage, portability, and effectiveness, and in this respect the present invention substantially fulfills this need.

SUMMARY OF THE INVENTION

In view of the foregoing disadvantages inherent in the known types of convertible car seat strollers now present in the prior art, the present invention provides an convertible car seat stroller wherein the same may be compactly interfitted into a receiving base that may be compactly stored or positioned for use as an automotive safety car seat and converted by removal from said base and extended for use as a stroller. As such, the general purpose of the present invention, which will be described subsequently in greater detail, is to provide a new and improved convertible car seat stroller which has all the advantages of the prior art convertible car seat strollers and none of the disadvantages.

To attain this, the present invention comprises an upper extensible portion which may be compactly folded and secured to a lower secondary portion which in turn may be secured as desired to an automotive seat. Upon separation of the upper and lower portions, a pivotally movable handle is rotatable to an upper lock position from a lower lock position to extend the upper portion for use as a stroller. Scissor linkage permits the extension and collapsing of the upper portion enabling mobile use of the unit.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved convertible car seat stroller which has all the advantages of the prior art convertible car seat strollers and none of the disadvantages.

It is another object of the present invention to provide a new and improved convertible car seat stroller which may be easily and efficiently manufactured and marketed.

It is a further object of the present invention to provide a new and improved convertible car seat stroller which is of a durable and reliable construction.

An even further object of the present invention is to provide a new and improved convertible car seat stroller which is susceptible of a low cost of manufacture with regard to both materials and labor, and which accordingly is then susceptible of low prices of sale to the consuming public, thereby making such convertible car seat strollers economically available to the buying public.

Still yet another object of the present invention is to provide a new and improved convertible car seat stroller which provides in the apparatuses and methods of the prior art some of the advantages thereof, while simultaneously overcoming some of the disadvantages normally associated therewith.

Still another object of the present invention is to provide a new and improved convertible car seat stroller that is readily and efficiently converted from use as a child's car seat to a child's stroller.

Yet another object of the present invention is to provide a new and improved convertible car seat stroller that is formed of an upper and lower portion wherein said upper portion is extensible and retractable in first and second locked positions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the instant invention illustrating the upper and lower portions secured together for use as a child's automotive safety seat.

FIG. 2 is an orthographic side view of the instant invention illustrating in phantom the upper portion in its retracted position.

FIG. 3 is an orthographic side view of the instant invention illustrating the upper portion removed from the lower portion in a retracted compact configuration, the various parts and their relationship.

FIG. 4 is an orthographic side view of the instant invention illustrating the upper portion in an extended position.

FIG. 5 is an orthographic plan view of the convertible car seat stroller, as illustrated in FIG. 4, taken along the lines 5—5 in the direction indicated by the arrows.

FIG. 6 is an orthographic view in elevation of the instant invention of FIG. 5 taken along the lines 6—6 in the direction indicated by the arrows.

DESCRIPTION OF THE PREFERRED EMBODIMENT

With reference now to the drawings, and in particular to FIG. 1 thereof, a new and improved convertible car seat stroller embodying the principles and concepts of the present invention and generally designated by the reference numeral 10 will be described.

To attain this, the present invention comprises a convertible car seat stroller formed of an upper portion 11 and a lower portion 12 securedly associated together by means of latches 13. A further latch 13 is positioned about the other side (not shown) in FIG. 1 of conventional construction, also whose illustration is merely duplicative of that illustrated in FIG. 1. Upper portion 11 is formed with a padded seat for comfort of a child to be secured therein and has further associated therewith a seat belt 15 of conventional configuration and construction and associated latch mechanisms secured to right and left wings 16 and 17 of upper portion 11 to securely position a child therein. Should additional belts and harness be deemed necessary, they may clearly be added as needed as such are of conventional construction well known in the art whose detail need not be amplified.

Lower portion 12 of convertible car seat stroller 10 has formed therein a plurality of seat belt openings 18 positioned as illustrated to enable securement of the instant invention to a car seat by the threading of a car seat associated with an automobile therethrough and latched to enable securement of the convertible car seat stroller 10 to an associated automotive seat. A cooperating seat belt opening 18 is positioned in a like orientation at the other side of the apparatus (not illustrated), as illustrated per FIG. 1, to enable the instant invention to be securely positioned in an automotive environment.

Reference to FIG. 2 illustrates the forward pivotal wheels 19 and rear fixed wheel 20 illustrated in phantom and the associated perimeter framework 21 supporting said wheels. FIG. 2 is illustrative of the wheels tucked within lower portion 12. Lower portion 12 may be of construction to allow an open bottom or a closed surface, but the principal function thereof is to provide a planar rear and bottom surface for engagement with an automotive seat or support surface of choice. FIGS. 5 and 6 illustrate pivotal support construction for forward and rear wheels 19 and 20 whereby bridge member 22 spans the distance between opposing lateral rails of perimeter framework 21 and supports the forward pivotal wheels by means of a conventional pivot structure, as illustrated in FIGS. 5 and 6 and indicated by numerals 23 enabling 360 degree rotational movement about pivotal structure 23 by means of support yokes 24. Solid axles 25 secure rear fixed wheels 20 to lateral portions of perimeter framework 21.

Reference to FIGS. 3 and 4 illustrate the respective retracted and extended position of the car seat converted into a stroller with lower portion 12 removed therefrom. An outer scissor link 26 is pivotally joined to an inner scissor link 27 at first pivot 29. An actuation link 28 is pivotally connected to outer scissor link 26 at a second pivot 30. Actuation link 28 is accordingly pivoted at its other end to a handle portion 31 at a third pivot 32. Outer scissor link 26 is slidably guided in guideway flange 34 containing a guideway therein, as illustrated by a slide connection 33. Outer link 26 is pivotally secured by means of a fourth pivot 35 within a perimeter flange 36 integrally joined to perimeter framework 21. Inner scissor link 27 is pivoted by means of a fifth pivot 38 to seat flange 37 whereas its other terminal end is guided within a second guideway flange 39 containing a guideway by means of an inner scissor link slide connection 40.

Handle portion 31, while pivoted to actuation link 28 at third pivot 32, is pivotally secured to upper portion 11 by means of a fixed handle pivot 41 enabling handle portion 31 to pivot from a lowermost position, as illustrated in FIG. 3, to its uppermost position, as illustrated in FIG. 4, to extend the convertible car seat stroller 10, as illustrated in FIG. 4. It is to be understood that for means of illustration purposes the one side, per the orthographic drawings of FIGS. 3 and 4, are illustrated but accordingly, mirror images of these various linkages and pivot points are positioned at the other side of convertible car seat stroller 10. A conventional spring loaded pin lock 42 is secured and integral with handle portion 31 to lock handle portion 31 in either its lower or upper position, illustrated respectively in FIGS. 3 and 4.

As to the manner of usage and operation of the present invention, the same should be apparent from the above description. However, for purposes of clarity a brief description will be set forth.

Assuming the convertible car seat stroller 10 is secured to an automotive car seat, the said car seat is removed from within lower portion 12 through seat belt openings 18 whereupon the apparatus 10 may be removed from within the confines of automotive environment. Thereafter lower portion 12 is separated from upper portion 11 by disengaging the various latch mechanisms 13 positioned about the assembly. Spring loaded pin lock 42 is disengaged whereupon handle portion 31 is pivoted from its lowermost position, as illustrated in FIG. 3, to its uppermost or raised position, as illustrated in FIG. 4, thereby through means of actuation, link 28 forcing slide connections 33 and 40 rearwardly to thereby raise the seat relative to perimeter framework 21. By means of exposed forward pivotal wheels 19 and rear fixed wheels 20 the invention may now be maneuvered about containing a child therein and perform the function of a stroller.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A convertible apparatus for selective use in an automotive environment or as a stroller comprising,
   first and second portions releasably securable together in a first position wherein said second portion is securable to said first portion therebelow and wherein said second portion includes opening means for acceptance of a seat belt or the like therethrough for securement of said apparatus, and
   said first portion terminating in a lower continuous peripheral edge of a first contour and said second portion terminating in an upper continuous peripheral edge of a second contour wherein said first and second contours are of a complementary configuration to mate said upper and lower continuous peripheral edges in a contiguous, non-overlapping relationship, and
   further including a plurality of individual fastening means to secure said first and second positions together, and
   said second portions removable from said first portion in a second position to expose mobility means, for enabling selective maneuvering of said apparatus and
   a pivotal handle means associated with said first portion for enabling pivotment from a lowered position to a raised position relative to said first portion to extend said mobility means, and
   said handle means completely positioned interiorly when in said lowered position within said first and second portions when said first and second portions are secured together and extending upwardly of said first portion when said handle means is in said raised position, and
   said first portion including a recessed seat for acceptance of an occupant therein.

2. An apparatus as set fourth in claim 1 wherein said mobility means include a rearward oriented pair of fixed wheels and a forwardly oriented pair of pivotal wheels.

3. An apparatus as set forth in claim 1 wherein said handle means is operably associated to plural pair of scissor links to extend and retract said mobility means.

4. A convertible apparatus as set forth in claim 1 wherein latch means is secured to said handle means for locking said handle means in said lowered or raised position.

5. An apparatus as set forth in claim 1 wherein said first portion includes a seat belt means for securing of an occupant within said recessed seat.

6. An apparatus as set forth in claim 1 wherein said mobility means are secured to a perimeter frame extensible and retractable relative to said seat means by means of a plural pair of scissor links.

7. An apparatus as set forth in claim 6 wherein each pair of scissor links comprises a plural pair of links pivoted relative to one another by means of a common pivot and one end of each of said links is operably secured to said lower perimeter frame and said other end of each of said links operably secured to said seat.

* * * * *